Sept. 3, 1968 J. S. SMITH 3,400,257

ARITHMETIC OPERATIONS USING TWO OR MORE DIGITAL-TO-ANALOG CONVERTERS

Filed Oct. 5, 1964

John S. Smith

INVENTOR

BY Richard E. Bee

ATTORNEY

United States Patent Office 3,400,257
Patented Sept. 3, 1968

3,400,257
ARITHMETIC OPERATIONS USING TWO OR MORE DIGITAL-TO-ANALOG CONVERTERS

John S. Smith, Ridgefield, Conn., assignor to Schlumberger Technology Corporation, Houston, Tex., a corporation of Texas Filed Oct. 5, 1964, Ser. No. 401,599
2 Claims. (Cl. 235—150.52)

ABSTRACT OF THE DISCLOSURE

A typical embodiment of the invention performs arithmetic operations during digital-to-analog signal conversion. A first digital-to-analog converter produces an output signal in response to a binary input. This output signal, however, is supplied to the source terminals of a second digital-to-analog converter. The combination of variable source signal and second digital input provides still another output signal that corresponds to the arithmetic function of the two digital inputs.

This invention relates to electrical computing and control methods and apparatus and, particularly, to computer circuits and control circuits which utilize electrical signals in both digital and analog form.

With the increasing use of digital recording, data processing and control techniques, it is becoming more common to encounter data processing systems and control systems wherein the various data signals and control signals are sometimes in digital form and sometimes in analog form. In such systems, it is sometimes desired to form the product or quotient or some other mathematical combination of two or more of the data signals. Where the signals to be combined are not of the same type, i.e., all digital or all analog, it has heretofore been necessary to convert one of them to the same form as the other before performing the computation or control action. This requires the use of one or more additional circuits.

In other data processing applications employing digital signals, the need frequently arises to convert the digital signals into analog signals. In such applications, the need also arises to perform various mathematical computations involving two or more of the data signals. In the past, one set of circuits has been provided for performing the computations and another set of circuits has been provided for performing the digital-to-analog conversion. It would be desirable if the number of circuits required in such circumstances could somehow be reduced.

It is an object of the invention, therefore, to provide a new and improved control method whereby the signal gain of an analog signal may be directly controlled by a digital control signal.

It is another object of the invention to provide a new and improved computing method whereby a mathematical computation and a digital-to-analog conversion may be performed by one and the same circuit.

It is a further object of the invention to provide new and improved methods of multiplying, dividing and performing other mathematical operations on electrical signals.

In accordance with one feature of the invention, a method of controlling the magnitude of an analog signal comprises the step of supplying the analog signal to the source terminals of a digital-to-analog converter circuit. The method further includes the step of supplying a plural-bit digital signal representing a numerical value proportional to the desired signal transfer coefficient for the analog signal to the digital input terminals of the digital-to-analog converter. The method further includes the step of utilizing the analog signal appearing at the analog output terminal of the digital-to-analog converter as the controlled-magnitude version of the analog signal supplied to the source terminals.

In accordance with another feature of the invention, a method of computing the function of two variables comprises the steps of generating an analog signal proportional in magnitude to a first of the two variables and generating a plural-bit digital signal representing in digital form the numerical value of the second variable. The method also includes the step of supplying the analog signal to the source terminals of a digital-to-analog converter circuit. The method further includes the step of supplying the digital signal to the digital input terminals of the digital-to-analog converter circuit. The method additionally includes the step of utilizing the analog signal appearing at the analog output terminal of the digital-to-analog converter circuit as a measure of the function of the two variables.

For a better understanding of the present invention, together with other and further objects and features thereof, reference is had to the following description taken in connection with the accompanying drawing, the scope of the invention being pointed out in the appended claims.

Referring to the drawing.

Figure 1:
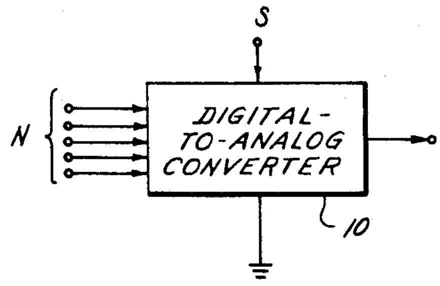
FIG. 1 shows a basic circuit element for performing various control and computing functions in accordance with the present invention.

Referring to FIGURE 1 of the drawing, there is shown a digital-to-analog converter 10 for converting a plural-bit digital signal into an analog signal. Converter 10 is constructed so that the individual bits of the digital signal operate to selectively switch weighted resistors into a network in accordance with the number represented by the coding of the bits. The network is energized by an electrical power supply source and the resistors are so proportioned that the resulting current or voltage appearing at a given point in the network is proportional in magnitude to the number represented by the digital signal. The digital signal input terminals for the converter 10 are indicated at N, a separate input line being provided for each bit in the digital signal. The source terminal to which is normally connected the electrical power supply is indicated at S. The output terminal at which appears the analog signal which is proportional to the digital number value is indicated at A.

Digital-to-analog converters of the general type just discussed are known in the art. In these known converters, the energizing current or voltage supplied to the source terminal S is of constant magnitude. In fact, it is usually not even thought of as being a separate input to the converter, but, instead, merely part of the internal power supply circuit for the converter. In accordance with a feature of the present invention, however, it has been found that new and useful results can be obtained if the quantity supplied to source terminal S is not a constant energizing voltage or current but is, instead, a variable electrical signal value.

One manner in which the converter 10 of FIG. 1 can be used in accordance with the present invention is to control the signal gain or signal loss of an analog signal. In this case, the source terminal S is used as the input terminal for the analog signal and the output terminal A is used as the output terminal for the analog signal. The signal transfer coefficient or "gain factor" between terminals S and A for the analog signal is then controlled by the digital number supplied to the digital input terminals N. As such, the converter 10 functions as a digitally controlled variable gain amplifier or a digitally controlled attenuator, depending on whether the net signal gain between terminals S and A is greater or less than unity. Regardless of the particular network configuration used within the converter 10, the gain can always be made greater than unity by including a signal amplifier circuit ahead of the output terminal A.

In accordance with another feature of the present invention, the digital-to-analog converter 10 of FIG. 1 can be used to compute the product or the quotient of an analog signal and a digital signal. In order to multiply an analog signal by a digital signal, the digital-to-analog converter 10 is constructed to operate in accordance with the mathematical expression:

$$A=kSN \qquad (1)$$

where S denotes the magnitude of the analog signal, N denotes the numerical value represented by the digital signal, $k$ denotes a proportionality constant and A denotes the magnitude of the analog output signal. The details of a representative converter circuit of this type are discussed hereinafter in connection with FIG. 3. As seen from Equation 1, the analog output signal A is proportional to the product of the analog input signal S times the digital input signal N. Not only is a multiplication operation performed, but, at the same time, the digital signal is, in effect, converted to analog form.

In order to divide an analog signal by a digital signal, the digital-to-analog converter circuit 10 is, in this case, constructed to operate in accordance with the mathematical relationship:

$$A=kS\left(\frac{1}{N}\right) \qquad (2)$$

An example of a particular manner of construction for achieving this type of operation is also discussed in connection with FIG. 3. A digital-to-analog converter of this type is also described in applicant's co-pending application Ser. No. 401,598 filed Oct. 5, 1964, and entitled "Signal Converter for Converting a Binary Signal to a Reciprocal Analog Signal."

Figures 2, 3:
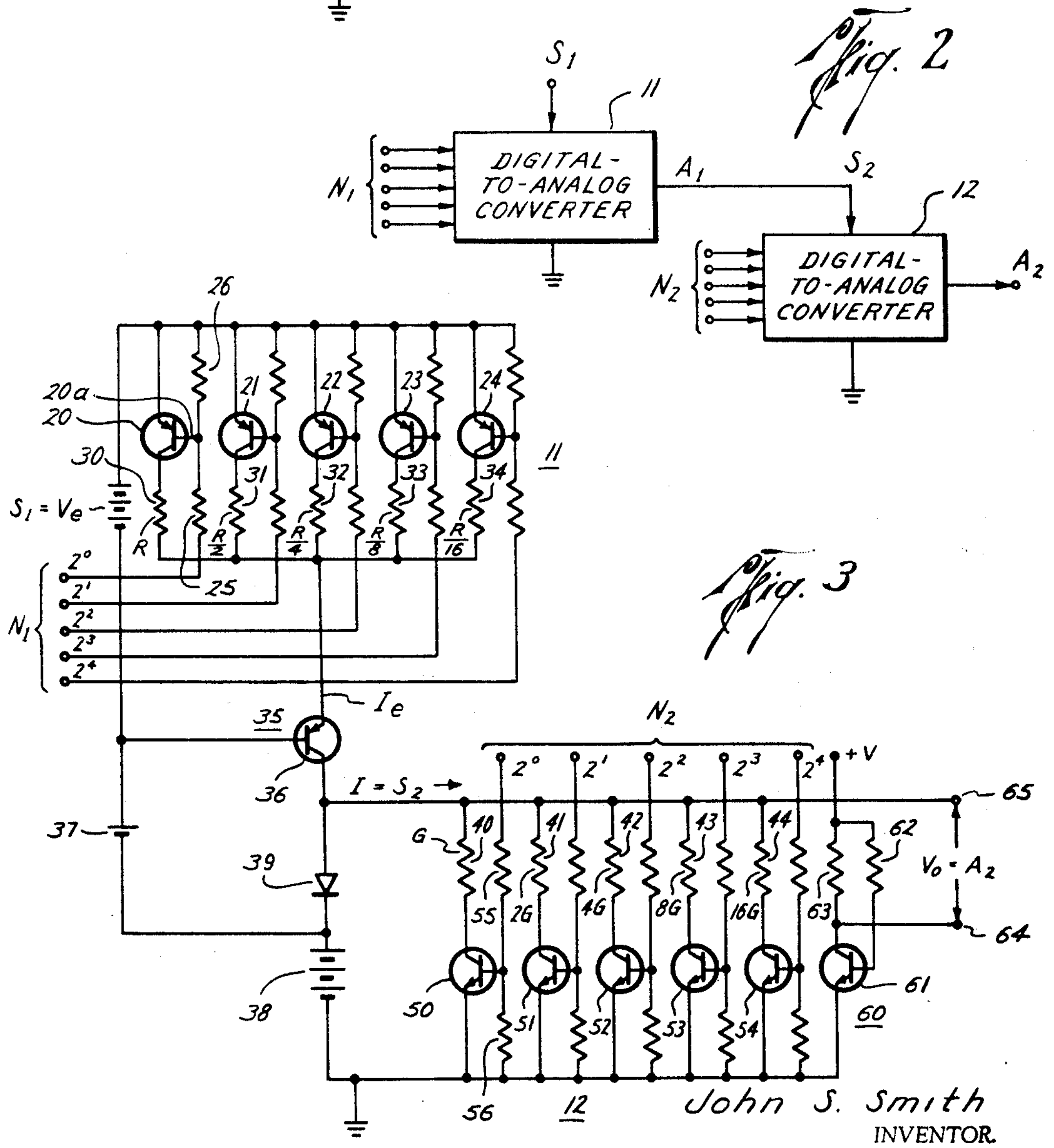
FIG. 2 shows the use of a pair of basic circuit units for performing mathematical computations.
FIG. 3 is a circuit diagram showing the details of a representative form of computer apparatus constructed in accordance with the present invention.

Referring now to FIGURE 2 of the drawing, there is shown a manner of using a pair of digital-to-analog converter circuits 11 and 12 for purposes of multiplying or dividing or performing other mathematical computations with a pair of digital input signals $N_1$ and $N_2$. In this case, the source terminal $S_1$ for the first converter circuit 11 is connected to a source of constant energizing voltage or current. The source terminal $S_2$ for the second converter circuit 12, on the other hand, is connected to the analog output terminal $A_1$ for the first converter circuit 11.

In order to multiply the digital signals $N_1$ and $N_2$, both of the converter circuits 11 and 12 are of the product type described by Equation 1 above. Thus, for converter circuit 11:

$$A_1=k_1S_1N_1 \qquad (3)$$

and for converter circuit 12:

$$A_2=k_2S_2N_2 \qquad (4)$$

Since $S_2$ is equal to $A_1$, Equation 3 may be substituted into Equation 4 giving:

$$A_2=k_1k_2S_1N_1N_2 \qquad (5)$$

Thus, the analog output signal $A_2$ from the second converter circuit 12 is proportional in magnitude to the product of the digital input signals $N_1$ and $N_2$.

In order to divide one digital number by another digital number, the converter circuit 11 is of the product type described by Equation 1, while converter circuit 12 is of the quotient type described by Equation 2. In this case, the equation for the second converter circuit 12 is:

$$A_2=k_2S_2\left(\frac{1}{N_2}\right) \qquad (6)$$

Since $S_2$ is again equal to $A_1$, Equation 3 may be substituted into Equation 6 to give:

$$A_2=k_1k_2S_1\left(\frac{N_1}{N_2}\right) \qquad (7)$$

Thus, in this case, the magnitude of the analog output signal $A_2$ is proportional to the quotient of the digital number $N_1$ divided by the digital number $N_2$.

By making both of the converter circuits 11 and 12 of the quotient type described by Equation 2 above, the final analog output signal may be made proportional to the reciprocal of the product of the two digital signals.

For more extended calculations, three or more digital-to-analog converter circuits can be used in cascade with one another, the analog output of the first being coupled to the source terminals of the second, the analog output of the second being coupled to the source terminals of the third, etc.

Referring now to FIGURE 3 of the drawing, there is shown in detail a particular manner of construction for the digital-to-analog converters 11 and 12 of FIG. 2 for the case where it is desired to divide a first digital signal $N_1$ by a second digital signal $N_2$. Thus, converter circuit 11 in FIG. 3 is of the product type, while converter circuit 12 of FIG. 3 is of the quotient or reciprocal type. Considering first the product type converter circuit 11, the individual binary bit signals $2^0$, $2^1$, $2^2$, etc. for the digital number $N_1$ are supplied to the control elements of a first plurality of switching devices represented by transistors 20–24. In particular, the bit signals are supplied to the base electrodes of the transistors 20–24. For example, the least-significant bit signal $2^0$ is supplied to the base electrode **20*a* of transistor 20. Resistors 25 and 26 which are used for this purpose are proportioned so that the transistor 20 will operate in a saturated conductive condition when the $2^0$ bit signal is at the binary "one" level and will be non-conductive when the $2^0$ signal is at the binary "zero" level. Similar considerations apply for the other transistors 21–24**.

Transistors 20–24 serve to selectively connect a plurality of weighted resistors 30–34 between a voltage supply means represented by a battery $V_e$ and a common load circuit means represented by the input side of a transistor amplifier circuit 35. For the case of a digital signal having a binary 1, 2, 4, 8, 16 code, resistors 30–34 are proportioned to have resistance values of R, $R/2$, $R/4$, $R/8$, and $R/16$, respectively, where R is the resistance value of the largest resistor.

The transistor amplifier circuit 35 includes a transistor 36 connected in a common base configuration. The input circuit or emitter-to-base circuit of transistor 36 constitutes the output load for the first converter circuit 11, while the output circuit or collector-to-base circuit of transistor 36 constitutes a source terminal supply circuit for the second converter circuit 12. With respect to the first converter circuit 11, the emitter-to-base circuit of transistor 36 provides a very low value of impedance. In particular, this impedance is small compared to the resistance of any of resistors 30–34.

Operating potential for the collector-to-base circuit of transistor 36 is provided by batteries 37 and 38 which are coupled between the base electrode and the collector electrode of transistor 36 by way of the main body of the second converter circuit 12. A diode 39 is connected between the collector electrode of transistor 36 and the junction between batteries 37 and 38.

The second converter circuit 12 of FIG. 3 includes a second plurality of weighted resistors 40–44 which are selectively connected in parallel with one another by means of a second plurality of switching devices represented by transistors 50–54. Transistors 50–54 are controlled by the individual binary bit signals $2^0$, $2^1$, $2^2$, etc. for the second digital signal $N_2$. Thus, for example, the least-significant bit signal $2^0$ is supplied to the base electrode of transistor 50 by means of resistors 55 and 56.

These resistors are proportioned so that transistor 50 will operate in a saturated conductive condition when the $2^0$ bit signal is at the binary "one" level. Transistor 50 will be non-conductive when the $2^0$ signal is at the "zero" level. Transistors 51–54 are operated in a similar manner by the remainder of the bit signals.

Resistors 40–44 are proportioned to have conductance values of G, 2G, 4G, 8G and 16G, respectively, for the case of a binary 1, 2, 4, 8, 16 code. The resistance of resistor 40 (reciprocal of G) should be small compared to the output impedance of the transistor amplifier circuit 35. In this regard, the common base configuration provides a relatively high output impedance for the amplifier 35.

An additional transistor circuit 60 is included at the output of the second converter circuit 12 for purposes of compensating for the small voltage drop across transistors 50–54 when conductive. This output circuit 60 includes a transistor 61 having its emitter electrode connected to the ground bus, its base electrode connected to a source of supply voltage +V by way of a resistor 62 and its collector electrode connected to the sourve +V by way of a resistor 63. As a consequence, transistor 61 is always conductive and is operated in a saturated condition. Transistor 61 is of the same type as transistors 50–54. The small collector-to-emitter voltage drop across transistor 61 is equal to the small voltage drop across any of the transistors 50–54 when conductive.

The final analog output signal $A_2$ is obtained between a pair of output terminals 64 and 65. The lower terminal 64 is connected to the collector electrode of transistor 61. As a consequence, the analog output voltage between terminals 64 and 65 corresponds to the voltage drop across the parallel connected resistors 40–44 alone, the small voltage drop across transistors 50–54 being balanced out or offset by the voltage drop across transistor 61.

Considering now the operation of the FIG. 3 apparatus, it is helpful to consider the mathematical expression for a plural-bit digital signal. For a digital signal having an ordinary binary coding of 1, 2, 4, 8, etc. this expression is:

$$N=B_0+2B_1+4B_2+8B_3+\ldots \quad (8)$$

where N denotes the numerical value represented by the digital signal and the terms on the right hand side of the equation represent the individual binary bits making up the complete digital signal. The factors $B_0$, $B_1$, $B_2$, etc. are constants which may assume values of either "zero" or "one," depending upon whether the binary bit value is a zero or a one.

Considering first the converter circuit 11, the current supplied to the emitter of the transistor 36 is described by the expression:

$$I_e=\left(\frac{V_e}{R}\right)B_0+\left(\frac{V_e}{R/2}\right)B_1+\left(\frac{V_e}{R/4}\right)B_2+\ldots \quad (9)$$

where $I_e$ is the current supplied to the emitter, $V_e$ is the value of the emitter circuit supply voltage, R is the basic resistance value and the factors $B_0$, $B_1$, $B_2$, etc. are constants which have a value of zero when the corresponding ones of transistors 20–24 are non-conductive and which have a value of one when the corresponding transistors are conductive. Since the on-off conditions of transistors 20–24 are controlled by the individual bits of the first digital signal $N_1$, Equation 9 may be rewritten as:

$$I_e=\frac{V_e}{R}\cdot N_1 \quad (10)$$

Thus, the emitter current $I_e$ is proportional in magnitude to the numerical value of the digital signal $N_1$.

Transistor 36 develops a collector current "I" which is proportional to the emitter current $I_e$. The current gain is very nearly unity, a typical figure being 0.98. The common base configuration causes the collector circuit of transistor 36 to function as a constant current source, the collector current "I" having a constant value for any given value of emitter current $I_e$. Consequently, variations in the value of load resistance presented by the parallel-connected resistor network formed by resistors 40–44 and transistors 50–54 will not cause any appreciable change in the value of the collector current I.

Considering now the second conveyor circuit 12, the weighted resistors 40–44 are connected in parallel with one another whenever their corresponding one of transistors 50–54 is conductive. Such transistor conduction is controlled by the individual binary bit signals making up the second digital signal $N_2$. The collector current I from transistor 36 is supplied to this parallel network. Assuming for the moment that the transistors 50–54 have zero resistance when conductive, then the voltage drop $V_o$ across the parallel network is described by the expression:

$$V_o=\frac{I}{G_t}=\frac{KI_e}{Gt} \quad (11)$$

where $G_t$ is the total conductance of the parallel network and K is the proportionality constant or current gain factor for the transistor 36.

Since conductances in parallel add, the total conductance $G_t$ is described by the expression:

$$G_t=GN_2=GB_0+2GB_1+4GB_2+8GB_3+\ldots \quad (12)$$

where the constants $B_0$, $B_1$, $B_2$, etc. assume values of either zero or one, depending upon whether the corresponding ones of transistors 50–54 are non-conductive or conductive. Again, a simple 1, 2, 4, 8, etc. binary code is assumed.

Substituting Equations 10 and 12 into Equation 11 gives:

$$V_o=\frac{KV_e}{RG}\left(\frac{N_1}{N_2}\right) \quad (13)$$

Thus, the magnitude of the voltage drop $V_o$ across the parallel resistor network of the converter 12 is proportional to the quotient of the digital numbers $N_1$ and $N_2$. As mentioned, the small voltage drop occurring across the transistors 50–54 when conductive is balanced out by a like voltage drop across the transistor 61 so that the final analog output signal appearing between output terminals 64 and 65 is also equal to $V_o$.

In order to provide the other types of computer apparatus discussed above in connection with FIG. 2, the particular product-type and quotient-type converter circuits shown in FIG. 3 may be used in the appropriate combinations. Thus, to multiply the digital signal $N_1$ by the digital signal $N_2$, a pair of product-type circuits each constructed in the manner of circuit 11 of FIG. 3 would be used in cascade, with the analog output of the first being adapted to provide the source terminal voltage for the second circuit.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Computer apparatus for computing the quotient of two variables comprising: first and second input circuit means for supplying first and second input signals of at least four binary signals each, the first of said binary signals having a numerical weight of $2^0$, the second having a numerical weight of $2^1$, the third having a numerical weight of $2^2$, and the fourth having a numerical weight of $2^3$; a first parallel circuit having at least four branches connecting in parallel with one another, each branch comprising a resistor connected in series with a switching device, the resistor in the first branch having a resistance value of R, the resistor in the second branch having a resistance value of $R/2$, the resistor in the third branch having a resistance value of $R/4$, and the resistor in the fourth branch having a resistance value of $R/8$, the switching device in the first branch being responsive to the first binary signal in the first input signal for opening and closing the first branch in accordance with the binary value thereof, the switching device in the second branch being responsive to the second binary signal in the first input signal for opening and closing the second branch in accordance with the binary value thereof, the switching device in the third branch being responsive to the third binary signal in the first input signal for opening and closing the third branch in accordance with the binary value thereof, and the switching device in the fourth branch being responsive to the fourth binary signal in the first input signal for opening and closing the fourth branch in accordance with the binary value thereof; circuit means for supplying a constant current to the parallel circuit to develop thereacross a voltage drop which constitutes an analog signal proportional to the numerical value represented by the binary coding of said four binary signals; a second parallel circuit having at least four branches connecting in parallel with one another, each branch comprising a resistor connected in series with a switching device, the resistance in the first branch having a conductance value of G, the resistor in the second branch having a conductance value of 2G, the resistor in the third branch having a conductance value of 4G, and the resistor in the fourth branch having a conductance value of 8G, the switching device in the first branch being responsive to the first binary signal in the second input signal for opening and closing the first branch in accordance with the binary value thereof, the switching device in the second branch being responsive to the second binary signal in the second input signal for opening and closing the second branch in accordance with the binary value thereof, the switching device in the third branch being responsive to the third binary signal in the second input signal for opening and closing the third branch in accordance with the binary value thereof, the switching device in the fourth branch being responsive to the fourth binary signal in the second input signal for opening and closing the fourth branch in accordance with the binary value thereof; further circuit means for connecting said analog signal proportional to the numerical value represented by the first input signal from said first parallel circuit to the branches in the second parallel circuit; and means for providing an indication of the voltage drop across the second parallel circuit, this voltage drop constituting a measure of the quotient of two variables.

2. Computer apparatus for computing the quotient of two variables comprising: circuit means for supplying a signal that corresponds to the first of the two variables, said first variable characterized by at least four binary signals, the first binary signal having a numerical weight of $2^0$, the second having a numerical weight of $2^1$, the third having a numerical weight of $2^2$ and the fourth having a numerical weight of $2^3$; a parallel circuit having at least four branches connecting in parallel with one another, each branch comprising a resistor connected in series with a switching device, the resistor in the first branch having a resistance value of R, the resistor in the second branch having a resistance value of $R/2$, the resistor in the third branch having a resistance value of $R/4$, and the resistor in the fourth branch having a resistance value of $R/8$, the switching device in the first branch being responsive to the first binary signal for opening and closing the first branch in accordance with the binary value thereof, the switching device in the second branch being responsive to the second binary signal for opening and closing the second branch in accordance with the binary value thereof, the switching device in the third branch being responsive to the third binary signal for opening and closing the third branch in accordance with the binary value thereof, and the switching device in the fourth branch being responsive to the fourth binary signal for opening and closing the fourth branch in accordance with the binary value thereof; circuit means for supplying to the branches in the parallel circuit a constant current and a voltage which constitutes an analog signal proportional to the reciprocal of the second of the two variables, and means for providing an indication of the voltage drop across the parallel circuit, this drop constituting a measure of the quotient of the two variables.

References Cited

UNITED STATES PATENTS

| | | | |
|---|---|---|---|
| 3,067,940 | 12/1962 | Preston | 235—150.5 |
| 3,146,343 | 8/1964 | Young | 235—150.5 |
| 3,152,249 | 10/1964 | Schmid | 235—150.51 |
| 3,177,350 | 4/1966 | Abbott et al. | 235—152 |
| 3,183,342 | 5/1965 | Wortzman | 235—156 |
| 3,194,950 | 7/1965 | Walls et al. | 235—154 |
| 3,217,151 | 11/1965 | Miller et al. | 235—194 |
| 3,267,265 | 8/1966 | Popodi et al. | 235—154 |

MARTIN P. HARTMAN, *Primary Examiner.*